(12) United States Patent
Beniluz

(10) Patent No.: US 12,179,276 B2
(45) Date of Patent: Dec. 31, 2024

(54) ROTARY CUTTING TOOL HAVING AN ENERGY HARVESTING ARRANGEMENT

(71) Applicant: Iscar, Ltd., Tefen (IL)

(72) Inventor: Lior Beniluz, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/152,971

(22) Filed: Jan. 20, 2021

(65) Prior Publication Data
US 2022/0226914 A1 Jul. 21, 2022

(51) Int. Cl.
*B23C 9/00* (2006.01)
*B23C 5/26* (2006.01)
*B23Q 1/00* (2006.01)
*B23Q 11/10* (2006.01)

(52) U.S. Cl.
CPC .............. *B23C 9/00* (2013.01); *B23C 5/26* (2013.01); *B23Q 1/0009* (2013.01); *B23Q 11/1023* (2013.01); *B23C 2270/022* (2013.01); *Y10T 409/309408* (2015.01)

(58) Field of Classification Search
CPC .............. B23Q 1/0009; B23Q 11/1023; B23Q 2230/002; B23B 2231/24; B23B 2231/34; B23B 2270/24; Y10T 279/17111; Y10T 409/30448; Y10T 409/309296; Y10T 409/309408; Y10T 409/30952; B23C 9/00; B23C 2270/022
USPC ....... 408/57, 59; 279/20; 409/144, 230, 232, 409/234
See application file for complete search history.

(56) References Cited

U.S. PATENT DOCUMENTS

| | | | |
|---|---|---|---|
| 4,716,657 A * | 1/1988 | Collingwood | G01B 7/002 33/561 |
| 5,564,872 A | 10/1996 | Veil et al. | |
| 5,567,093 A * | 10/1996 | Richmond | B23Q 1/0036 279/46.9 |
| 5,904,451 A | 5/1999 | Gerber | |
| 6,840,723 B2 | 1/2005 | Jacobsson | |
| 7,464,483 B2 * | 12/2008 | Schopf | H02K 7/1823 33/561 |

(Continued)

FOREIGN PATENT DOCUMENTS

| | | |
|---|---|---|
| DE | 10 2014 009 353 | 12/2014 |
| DE | 102015100073 A1 * | 7/2016 |

(Continued)

OTHER PUBLICATIONS

International Search Report dated Apr. 4, 2022, issued in PCT counterpart application (No. PCT/IL2021/051513).

(Continued)

*Primary Examiner* — Sunil K Singh
*Assistant Examiner* — Michael Vitale
(74) *Attorney, Agent, or Firm* — Womble Bond Dickinson (US) LLP

(57) ABSTRACT

A rotary cutting tool has a tool holder and a cutting portion releasably attached to the tool holder. The tool holder includes a mounting portion designed to be attached to a spindle. The rotary cutting tool also has a fluid channel and an energy harvesting arrangement which includes a turbine located in the fluid channel. The fluid channel opens out to a channel inlet opening, for the supply of fluid, located at the mounting portion and a channel outlet opening in fluid communication with the channel inlet opening.

25 Claims, 2 Drawing Sheets

(56) References Cited

U.S. PATENT DOCUMENTS

| | | | |
|---|---|---|---|
| 2005/0238451 A1* | 10/2005 | Hartman | B23B 31/1179 |
| | | | 409/234 |
| 2009/0215598 A1 | 8/2009 | Migliore et al. | |
| 2009/0234490 A1* | 9/2009 | Suprock | B23C 5/109 |
| | | | 408/116 |
| 2015/0125230 A1 | 5/2015 | De Nijs | |
| 2016/0207122 A1* | 7/2016 | Chen | B23C 5/28 |
| 2019/0070672 A1* | 3/2019 | Haimer | B23B 31/11 |
| 2021/0370452 A1 | 12/2021 | Frank et al. | |

FOREIGN PATENT DOCUMENTS

| | | | |
|---|---|---|---|
| EP | 2095897 | 9/2009 | |
| EP | 3381607 A1 * | 10/2018 | B23B 29/125 |
| WO | WO-2017099682 A1 * | 6/2017 | B23C 5/10 |
| WO | WO-2018003342 A1 * | 1/2018 | B23B 29/12 |

OTHER PUBLICATIONS

Written Opinion dated Apr. 4, 2022, issued in PCT counterpart application (No. PCT/IL2021/051513).

* cited by examiner

ROTARY CUTTING TOOL HAVING AN ENERGY HARVESTING ARRANGEMENT

FIELD OF THE INVENTION

The subject matter of the present application relates to rotary cutting tools, and in particular to such rotary cutting tools having an energy harvesting arrangement, and further in particular to such energy harvesting arrangements having a turbine actuated by fluid.

BACKGROUND OF THE INVENTION

Cutting tool assemblies can include an energy harvesting arrangement having a turbine actuated by fluid.

EP 2 095 897 discloses a tool-holder assembly. A secondary pipe is derived from a main pipe that feeds the usual flow of pressurized lubricant-coolant in the machining area. A generator is located at the secondary pipe. In this way, a part of said flow, which is provided for lubrication/cooling in the machining area, is used for actuating the turbine that sets the generator in rotation. The fluid at output from the generator is conveyed through the secondary pipe to a discharge outlet.

US 2015/125230 discloses an apparatus comprising a spindle and a tool including a tool holder secured in mating relationship with an end of the spindle. The tool has a work-piece end wholly powered by an energy harvesting device. In a first embodiment (FIG. 2) a second fluid flow passage extends through the tool holder for delivery of fluid to the energy harvesting device. The energy harvesting device powers a sensor that may be used to inspect the work-piece as part of a machining process. In a second embodiment (FIG. 6) the work-piece end includes a device for inserting threaded inserts into a work-piece. The energy harvesting device harvests energy from the rotational motion of the spindle transmitted to a shaft of the tool and tool holder.

U.S. Pat. No. 4,716,657 discloses a machine having a movable member capable of releasable supporting a tool for performing an operation on a workpiece, and a supply of pressurized fluid. The tool includes an electric circuit which is provided with power from an electrical generator drivingly connected to a turbine driven by the machine's supply of pressurized fluid. In a first embodiment (FIG. 1) the machine includes a measuring probe. In a second embodiment (FIG. 2) the machine includes a boring bar having a cutter. The turbine in the form of a Pelton Wheel is provided around the outer periphery of the collar.

U.S. Pat. No. 6,840,723 discloses a working unit intended to be mounted on a movable machine operated tool support. The working unit includes a casing which is attached to the tool support and which supports a pneumatic turbine motor with a rotor, a shank end mill type machining tool with a cutter portion extending out of the casing and a shank portion rotatively journalled in the casing. The machining tool shank portion is rigidly integrated with a turbine wheel to form the turbine rotor. A flow control valve is arranged to deliver pressurized air to the turbine motor.

SUMMARY OF THE INVENTION

In accordance with a first aspect of the subject matter of the present application there is provided a rotary cutting tool having a tool central axis which defines opposite forward and rearward directions and about which the rotary cutting tool is rotatable, the rotary cutting tool comprising:

a tool holder comprising a mounting portion and a cutting portion receiving portion located at opposite rearward and forward ends of the tool holder, respectively;

a cutting portion releasably attached at the cutting portion receiving portion, the cutting portion comprising a cutting edge;

a fluid channel comprising:
  a) a channel inlet opening located at the mounting portion and configured to receive a supply of fluid;
  b) a channel outlet opening in fluid communication with the channel inlet opening and configured to discharge fluid entering at the channel inlet opening; and
  c) a channel turbine chamber located between the channel inlet and outlet openings; and an energy harvesting arrangement comprising:
  a turbine located in the channel turbine chamber, the turbine configured to be rotated by fluid flowing from the channel inlet opening to the channel outlet opening, in a forward flow direction.

It is understood that the above-said is a summary, and that features described hereinafter may be applicable in any combination to the subject matter of the present application, for example, any of the following features may be applicable to the rotary cutting tool:

The rotary cutting tool can comprise a single fluid channel.

The rotary cutting tool can have only a single channel inlet opening and a single channel outlet opening, and the fluid channel may not branch between the channel inlet opening and the channel outlet opening.

The channel outlet opening can be located at either the cutting portion or at the forward end of the tool holder.

The channel outlet opening can be located at the cutting portion.

The channel outlet opening can be oriented to discharge fluid in the vicinity of the cutting edge.

The fluid channel can be a through channel formed within the rotary cutting tool.

The cutting portion can be integrally formed to have unitary, one-piece construction.

The tool holder can be integrally formed to have unitary, one-piece construction.

The tool holder can comprise holder rear and forward surfaces and a holder peripheral surface extending therebetween about the tool central axis. The holder rear surface can be located at the rearward end of the rotary cutting tool. The channel inlet opening can be located at the holder rear surface.

The fluid channel can pass through the holder forward surface.

The rotary cutting tool can further comprise a fastening arrangement comprising a chucking nut and a collet. The cutting portion can be releasably attached to the tool holder by the chucking nut and the collet.

The fluid channel can comprise a channel turbine antechamber adjoining the channel turbine chamber and located rearward thereof with respect to the forward flow direction. In a radial cross-section taken in a plane perpendicular to the tool central axis through the fluid channel, a cross-sectional area of the fluid channel can be greater at the channel turbine chamber than at the channel turbine antechamber.

The fluid channel can include a channel turbine post-chamber adjoining the channel turbine chamber and located forward thereof with respect to the forward flow direction. The cutting portion can extend into the channel turbine post-chamber and is spaced apart from the turbine.

The channel turbine chamber can be aligned with the tool central axis.

The turbine can comprise a plurality of radially extending turbine blades. The plurality of radially extending turbine blades can be made of aluminum.

The energy harvesting arrangement can further comprise an electric generator which is located in the channel turbine chamber and is drivingly connected to the turbine.

The energy harvesting arrangement can further comprise two cables extending from the electric generator and terminating at two electrical connectors mounted on the tool holder.

A portion of each of the two cables can be located in the fluid channel.

The tool holder can comprise holder rear and forward surfaces and a holder peripheral surface extending therebetween about the tool central axis, the holder rear surface can be located at the rearward end of the rotary cutting tool. The holder peripheral surface can comprise a holder lateral recess recessed therein. The rotary cutting tool can comprise an electrical arrangement, the two electrical connectors being located thereat. The electrical arrangement can be located in the holder lateral recess.

The electrical arrangement can include a sensor configured to monitor the cutting tool and/or a cutting operation.

The electrical arrangement can further comprise a rechargeable battery configured to power the sensor, the rechargeable battery receiving power from the electric generator.

The fluid channel can contain the tool central axis for the entire of length the fluid channel, through the tool holder.

The fluid channel can contain the tool central axis for the entire length of the fluid channel, through both the tool holder and the cutting portion.

The rotary cutting tool can further comprise a turbine receptacle portion separatable from, and located within, the tool holder. The channel turbine chamber can be formed within the turbine receptacle portion.

BRIEF DESCRIPTION OF THE FIGURES

For a better understanding of the present application and to show how the same may be carried out in practice, reference will now be made to the accompanying drawings, in which.

Figure 1:
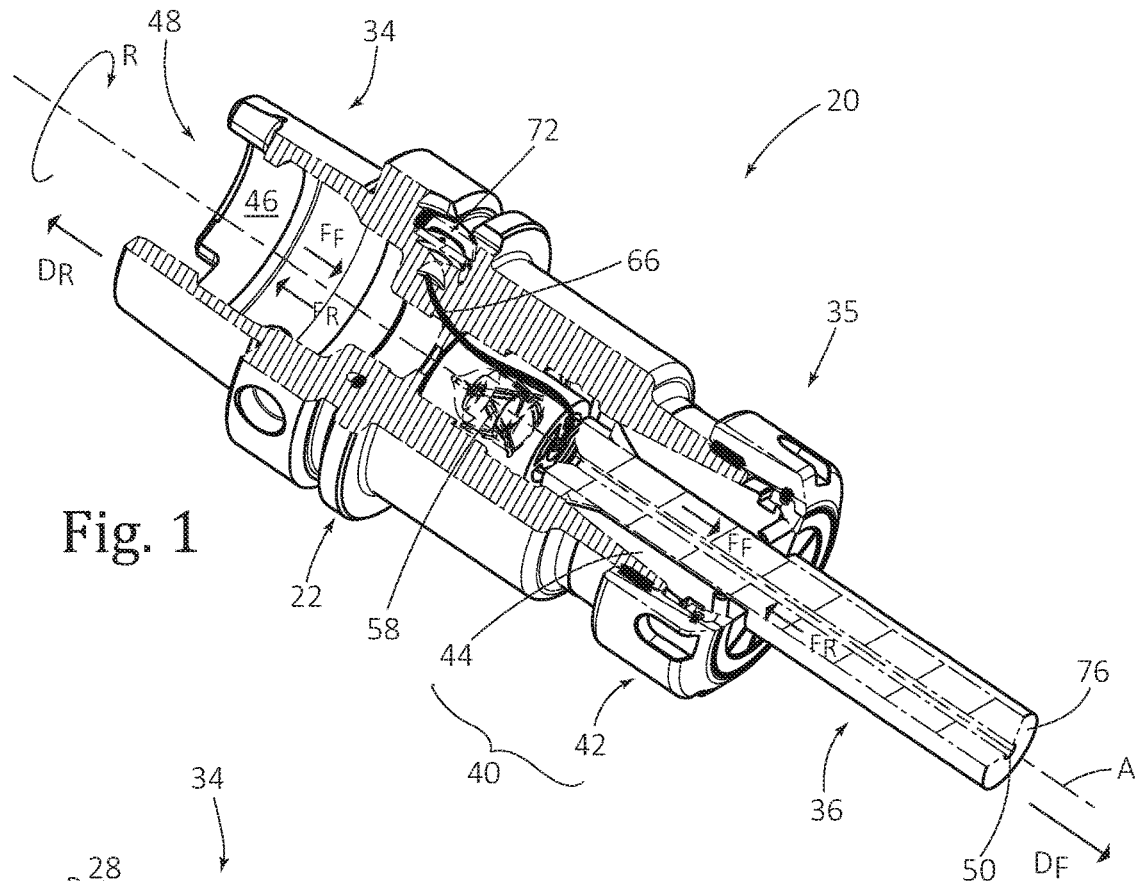
FIG. 1 is a perspective view of a rotary cutting tool, partially cut-away, in accordance with the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
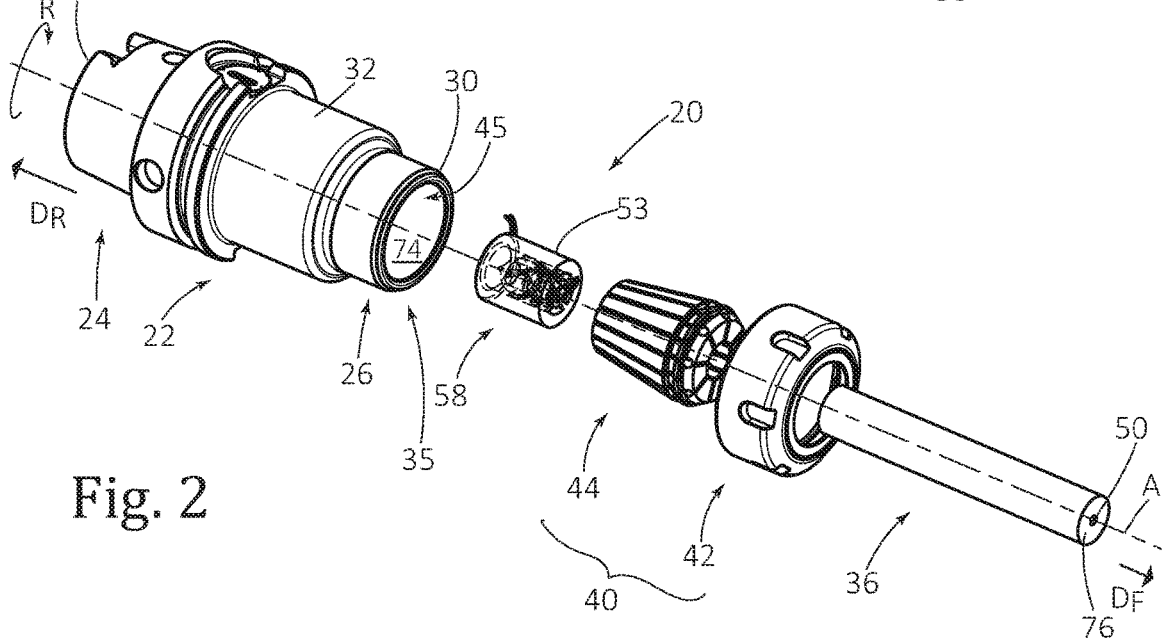
FIG. 2 is an exploded perspective view of the rotary cutting tool shown in FIG. 1.

Attention is first drawn to FIGS. 1 and 2, showing a rotary cutting tool 20, depicting an aspect of the present application. In this non-limiting example shown in the drawings, the rotary cutting tool 20 can form a drilling tool suitable for drilling cutting operations. The rotary cutting tool 20 has a tool central axis A. The tool central axis A defines opposite forward and rearward directions $D_F$, $D_R$. The tool central axis A forms an axis of rotation about which the rotary cutting tool 20 is rotatable in a rotational direction R.

It should be appreciated that in the following discussion with regard to the rotary cutting tool 20 use of the terms "forward" and "rearward" throughout the description and claims refer to a relative position in a direction of the tool central axis A to the right and left, respectively, in FIGS. 3 and 4. Moreover, the terms "axial" and "radial" are with respect to the tool central axis A, unless specified otherwise.

Figure 3:
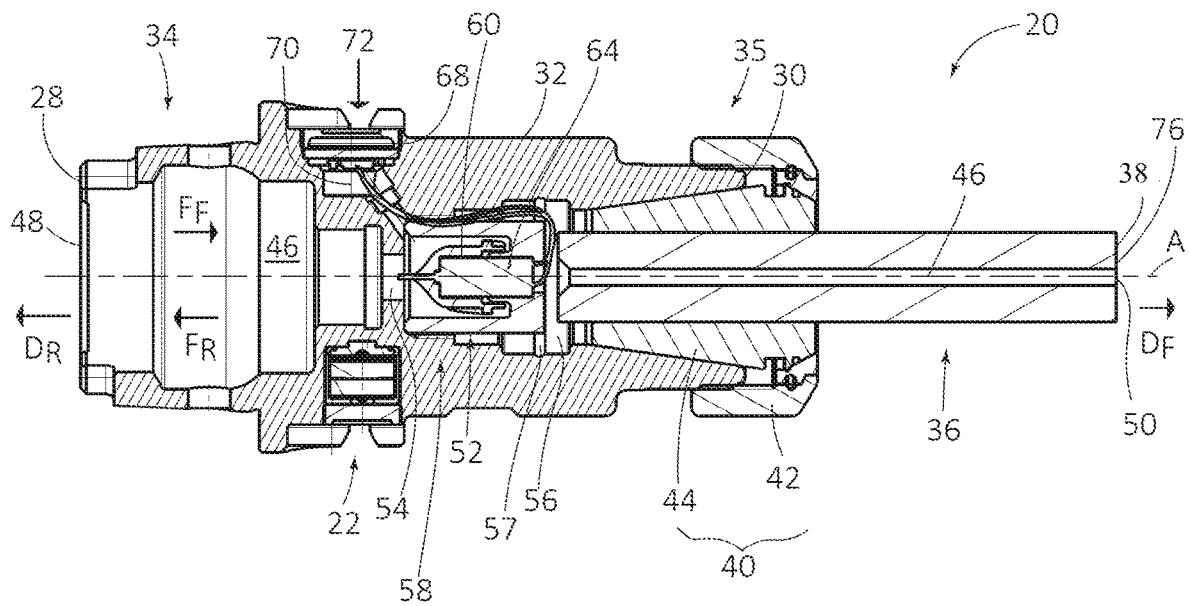
FIG. 3 is an axial cross-sectional view of the rotary cutting tool shown in FIG. 1.

Referring in particular to FIGS. 2 and 3, the rotary cutting tool 20 has a tool holder 22. The tool holder 22 includes a rearward end 24 and a forward end 26 located opposite the rearward end 24. In accordance with some embodiments of the subject matter of the present application, the tool holder 22 can be made from steel. The tool holder 22 can be integrally formed to have unitary, one-piece construction. The tool holder 22 can include holder rear and forward surfaces 28, 30 and a holder peripheral surface 32 which extends between the holder rear and forward surfaces 28, 30. The holder peripheral surface 32 can extend about the tool central axis A. The holder rear surface 28 can be located at the rearward end 24 of the rotary cutting tool 20.

The tool holder 22 includes a mounting portion 34 located at the rearward end 24 of the tool holder 22. The mounting portion 34 is designed to be attached to a spindle (not shown) which provides a driving means in order to rotate the cutting tool 20.

As best seen in FIG. 2, the tool holder 22 includes a cutting portion receiving portion 35 located at the forward end 24 of the tool holder 22. The cutting portion receiving portion 35 is designed to receive a cutting portion. The cutting portion receiving portion 35 is located axially opposite the mounting portion 34.

The rotary cutting tool 20 has a cutting portion 36. The cutting portion 36 is releasably attached to the tool holder 22. Specifically, the cutting portion 36 is attached to the tool holder 22 at the tool holder's cutting portion receiving portion 35. The cutting portion 36 includes a cutting edge 38, for cutting of a workpiece. In accordance with some embodiments of the subject matter of the present application, the cutting portion 36 can be integrally formed to have unitary, one-piece construction. In such a configuration, the cutting portion 36 can be made of cemented carbide. Alternatively, the cutting portion 36 can include a shank portion having at least one cutting insert releasably attached thereto at a forward end of the shank portion. In such a configuration, the cutting insert can be made of cemented carbide and the shank portion made from steel.

In accordance with some embodiments of the subject matter of the present application, the rotary cutting tool 20 can include a fastening arrangement. In this non-limiting example shown in the drawings, the fastening arrangement 40 can include a chucking nut 42 and a collet 44. The cutting portion 36 can be releasably attached to the tool holder 22 by the chucking nut 42 and the collet 44. The cutting portion receiving portion 35 can include a conical recess 45 for receiving the collet 44. Specifically, the conical recess 45 can be formed in the holder forward surface 30.

The rotary cutting tool 20 includes a fluid channel 46. The fluid channel 46 serves to convey fluid for actuation of a turbine, as described later in the description. In accordance with some embodiments of the subject matter of the present application, the fluid can be, for example, oil, water, emulsion. The fluid channel 46 can be a through channel formed within the rotary cutting tool 20.

The fluid channel 46 may contain the tool central axis A for the entire length of the fluid channel through the tool holder 22. The fluid channel 46 may contain the tool central axis A for the entire length of the fluid channel through both the tool holder 22 and the cutting portion 36. Alternatively, the fluid channel 46 may contain tool central axis A for a partial length of the fluid channel through the tool holder 22. The fluid channel 46 may contain the tool central axis A for a partial length of the fluid channel through both the tool holder 22 and the cutting portion 36

The fluid channel 46 includes a channel inlet opening 48 located at the mounting portion 34. The channel inlet opening 48 is configured to receive a supply of fluid. In accordance with some embodiments of the subject matter of the present application, the channel inlet opening 48 can be located at the rearward end 24 of the tool holder 22. Specifically, the channel inlet opening 48 can be located at the holder rear surface 28. That is to say, the fluid channel 46 can open out to the holder rear surface 28 at the channel inlet opening 48.

The fluid channel 46 also includes a channel outlet opening 50. The channel outlet opening 50 is in fluid communication with the channel inlet opening 48. Fluid flows in the fluid channel 46 from the channel inlet opening 48 to the channel outlet opening 50 defining a forward flow direction $F_F$. The channel outlet opening 50 is configured to discharge fluid entering at the channel inlet opening 48. The forward flow direction $F_F$ extends in a direction along the fluid channel 46 from the channel inlet opening 48 to the channel outlet opening 50. A rearward flow direction $F_R$ is a direction opposite the forward flow direction $F_F$. That is to say, the rearward flow direction $F_R$ extends in a direction along the fluid channel 46 from the channel outlet opening 50 to the channel inlet opening 48. In accordance with some embodiments of the subject matter of the present application, notwithstanding the fluid flow through the turbine, the forward and rearward flow directions $F_F$, $F_R$ may be generally linear. The channel outlet opening 50 can be located at either the cutting portion 36 or at the forward end 24 of the tool holder 22.

Figure 4:
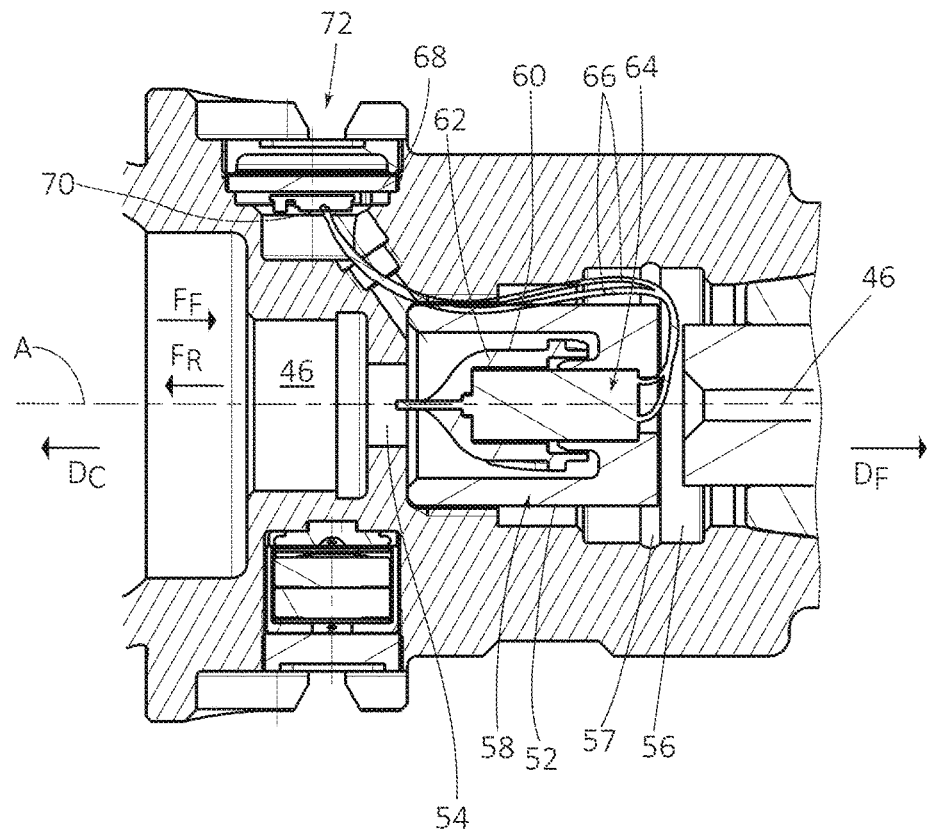
FIG. 4 is a detail of FIG. 3.

Making reference in particular to FIGS. 3 and 4, the fluid channel 46 includes a channel turbine chamber 52. That is to say, the channel turbine chamber 52 is located in, and forms part of, the fluid channel 46. The channel turbine chamber 52 is designed for housing at least a turbine 60 as described later in the description. The channel turbine chamber 52 is located between the channel inlet and outlet openings 48, 50. In accordance with some embodiments of the subject matter of the present application, the rotary cutting tool 20 can include a turbine receptacle 53 separatable from, and located within, the tool holder 22. As best seen in FIGS. 2-4, the turbine receptacle 53 is formed as a separate element which is received into the tool holder 22 at the latter's forward end 26 and occupies the channel turbine chamber 52. The turbine 60, in turn, is located in the turbine receptacle 53. The channel turbine chamber 52 can be located between the rearward end 24 of the tool holder 22 and the cutting portion receiving portion 35. The channel turbine chamber 52 can be aligned with the tool central axis A. Stated differently, the channel turbine chamber 52 can be centered about and intersected by the tool central axis A. Thus, a turbine located in the channel turbine chamber 52 is also aligned with the tool central axis A allowing the rotary cutting tool 20 to be balanced.

In accordance with some embodiments of the subject matter of the present application, the fluid channel 46 can include a channel turbine antechamber 54 which adjoins the channel turbine chamber 52 and which is located rearward thereof with respect to the forward flow direction $F_R$. That is to say, the channel turbine antechamber 54 precedes the channel turbine chamber 52 with respect to the forward flow direction $F_F$. As best seen in FIG. 4, an axial length (length taken along the tool central axis A) of the channel turbine antechamber 54 is smaller than an axial length of the channel turbine chamber 52. In a radial cross-section taken in a plane perpendicular to the tool central axis A through the fluid channel 46, a cross-sectional area of the fluid channel 46 can be greater at the channel turbine chamber 52 than at the channel turbine antechamber 54. As seen in FIGS. 3 and 4, the entirety of the channel turbine chamber 52 is axially forward (in the forward flow direction $F_F$) of the mounting portion 34. The entirety of the channel turbine antechamber 54 is also axially forward of the mounting portion 34. Like the channel turbine chamber 52, the channel turbine antechamber 54 can be aligned with the tool central axis A. Stated differently, the channel turbine antechamber 54 can be centered about and intersected by the tool central axis A. The channel turbine chamber 52, and the channel turbine antechamber 54 are preferably cylindrical, though at least the channel turbine antechamber 54 can be conical with a taper in the forward flow direction $F_F$.

In accordance with some embodiments of the subject matter of the present application, the fluid channel 46 can include a channel turbine post-chamber 56 which adjoins the channel turbine chamber 52 and which is located forward thereof with respect to the forward flow direction $F_F$. The channel turbine post-chamber 56 can be separated from the channel turbine chamber 52 by an annular groove 57. In a radial cross-section taken in a plane perpendicular to the tool central axis A through the fluid channel 46, the cross-sectional area of the fluid channel 46 can be smaller at the forwardmost portion of the channel turbine chamber 52 than at the channel turbine post-chamber 56. The cutting portion receiving portion 35 and/or the conical recess 45 can extend in the rearward direction $D_R$ to the channel turbine post-chamber 56. The cutting portion 36 can extend into the channel turbine chamber 52. The cutting portion 36 can be spaced apart from the turbine 60.

The rotary cutting tool 20 includes an energy harvesting arrangement 58. The energy harvesting arrangement 58 is configured to harvest electrical energy. Such energy harvesting can be used, for example, for powering an electrical arrangement, such as sensor and/or a rechargeable battery (optionally configured to power such a sensor). In the case of the latter, this avoids the need to replace batteries, which can only be performed by stopping the cutting operation.

Referring to FIG. 4, the energy harvesting arrangement 58 includes a turbine 60. The turbine 60 is located in the fluid channel 46 at the channel turbine chamber 52. Stated differently, the turbine 60 is located in the channel turbine chamber 52. The turbine 60 is configured to be rotated in response to fluid flow from the channel inlet opening 48 to the channel outlet opening 50, in the forward flow direction $F_F$. In accordance with some embodiments of the subject matter of the present application, the turbine 60 can include a plurality of radially extending turbine blades 62. The plurality of radially extending turbine blades 62 can be made of a metal, in particular the plurality of radially extending turbine blades 62 can be made of aluminum. Advantageously, this configuration provides sufficient strength and rigidity for the turbine blades 62 not to break or bend.

In accordance with some embodiments of the subject matter of the present application, the energy harvesting arrangement 58 can also include an electric generator 64 drivingly connected to the turbine 60. The electric generator 64 can be located in the channel turbine chamber 52. The electric generator 64 can be used to power an electrical arrangement.

In accordance with some embodiments of the subject matter of the present application, the energy harvesting arrangement 58 can include two cables 66 which extend from the electric generator 64 and terminate at two electrical connectors 70, mounted on the tool holder 22. A portion of each of the two cables 66 can be located in the fluid channel 46. In particular, a portion of each of the two cables 66 that extend immediately (i.e. adjoins) from the turbine 60 can be located in the fluid channel 46. It is understood that a single electric cable carrying two wires and extending from the generator to a single electrical connector having two terminals may also be used.

In accordance with some embodiments of the subject matter of the present application, the rotary cutting tool 20 can include an electrical arrangement 72. The two electrical connectors 70 can be located at the electrical arrangement 72. When the turbine 62 rotates, the electric generator 64 outputs electrical energy via the two cables 66 to power the electrical arrangement 72. Stated differently, the electric generator 64 can be in electrical communication with the electrical arrangement 72. The electrical arrangement 72 can be a sensor designed to monitor the condition of the cutting tool and/or the cutting operation. For example, the sensor can determine axial pull-out of the cutting portion 36 from the cutting portion receiving portion 35. Alternatively, or in addition, the electrical arrangement 72 can include a rechargeable battery designed to power, for example, the sensor. Advantageously, such a configuration avoids the user having to stop the tool for battery replacement when such a sensor is powered by a non-rechargeable battery.

In accordance with some embodiments of the subject matter of the present application, the holder peripheral surface 32 can include a holder lateral recess 68 recessed therein. The electrical arrangement 72 can be located in the holder lateral recess 68, thereby protecting the electrical arrangement 72 from impact by, for example, cut away chips. As seen in FIGS. 3 and 4, the holder lateral recess 68 and/or the electrical arrangement 72 overlap the channel turbine antechamber 54 in an axial direction along the tool central axis A.

Referring to FIGS. 3 and 4, in accordance with some embodiments of the subject matter of the present application, the fluid channel 46 can extend into the cutting portion 36. Thus, the channel outlet opening 50 can be located at the cutting portion 36. Specifically, the channel outlet opening 50 can be located at a forwardmost cutting portion surface 76 of the cutting portion 36. That is to say, the fluid channel 46 can open out to the forwardmost cutting portion surface 76 at the channel outlet opening 50. The channel outlet opening 50 can be oriented to discharge fluid in the vicinity of the cutting edge 38. The channel outlet opening 50 can be located adjacent the cutting edge 36. The channel outlet opening 50 can face in the forward direction $D_F$. That is to say, a normal which is perpendicular to a plane defined by the channel outlet opening 50 can extend generally parallel to the tool central axis A. In the configuration including the chucking nut 42 and collet 44, the fluid channel 46 can pass through the holder forward surface 30 at the conical recess 45. The channel outlet opening 50 can be located at the collet 44 and/or chucking nut 42 (not shown).

In accordance with some embodiments of the subject matter of the present application, the rotary cutting tool 20 is devoid of a secondary channel with its own inlet and outlet. That is to say, the rotary cutting tool 20 has only a single channel inlet opening 48 and a single channel outlet opening 50 (i.e. the rotary cutting tool 20 includes a single (i.e. exactly one) fluid channel 46. Moreover, the fluid channel 46 may not branch between the channel inlet opening 48 and the channel outlet opening 50 (so as to open out to another outlet), as shown for example in EP 2 095 897. Thus, advantageously, a single fluid channel 46 is used for conveying coolant to the cutting edge 38 and also conveying fluid to actuate the turbine 60.

Although the subject matter of the present application has been described to a certain degree of particularity, it should be understood that various alterations and modifications could be made without departing from the spirit or scope of the invention as hereinafter claimed.

What is claimed is:

1. A rotary cutting tool (20) having a tool central axis (A) which defines opposite forward and rearward directions ($D_F$, $D_R$) and about which the rotary cutting tool (20) is rotatable, the rotary cutting tool (20) comprising:
   a tool holder (22) comprising opposite rearward and forward ends (24, 26);
   a cutting portion (36) releasably attached to the forward end of the tool holder (22), the cutting portion (36) comprising a cutting edge (38);
   a fluid channel (46) comprising:
   a) a channel inlet opening (48) located at the rearward end (24) of the tool holder (22) and configured to receive a supply of fluid;
   b) a channel outlet opening (50) in fluid communication with the channel inlet opening (48) and configured to discharge fluid that entered at the channel inlet opening (48);
   c) a channel turbine chamber (52) located between the channel inlet and outlet openings (48, 50); and
   d) a channel turbine antechamber (54) adjoining the channel turbine chamber (52) and located rearward thereof with respect to the tool central axis (A);
   a turbine receptacle (53) formed as a separate element from the tool holder (22), the turbine receptacle (53) being received into the tool holder (22) and occupying the channel turbine chamber (52); and
   an energy harvesting arrangement (58) comprising:
   a turbine (60) located in the turbine receptacle (53) occupying the channel turbine chamber (52), the turbine (60) configured to be rotated by fluid flowing from the channel inlet opening (48) to the channel outlet opening (50), in a forward flow direction ($F_F$);
   wherein:
   an axial length of the channel turbine antechamber (54) is smaller than an axial length of the channel turbine chamber (52);
   the channel outlet opening is located at the cutting portion (36); and the channel outlet opening is oriented to discharge said fluid that entered at the channel inlet opening (48) as a coolant, after said fluid has rotated the turbine (60).

2. The rotary cutting tool (20), according to claim 1, wherein the rotary cutting tool (20) comprises a single fluid channel (46).

3. The rotary cutting tool (20), according to claim 1, wherein the rotary cutting tool (20) has only a single channel inlet opening (48) and a single channel outlet opening (50), and the fluid channel (46) does not branch between the channel inlet opening (48) and the channel outlet opening (50).

4. The rotary cutting tool (20), according to claim 1, wherein the fluid channel (46) is a through channel formed within the rotary cutting tool (20).

5. The rotary cutting tool (20), according to claim 1, wherein the cutting portion (36) is integrally formed to have a unitary, one-piece construction.

6. The rotary cutting tool (20), according to claim 1, wherein the tool holder (22) is integrally formed to have a unitary, one-piece construction.

7. The rotary cutting tool (20), according to claim 1, wherein:
the tool holder (22) comprises holder rear and forward surfaces (28, 30) and a holder peripheral surface (32) extending therebetween about the tool central axis (A);
the holder rear surface (28) is located at the rearward end (24) of the rotary cutting tool (20); and
the channel inlet opening (48) is located at the holder rear surface (28).

8. The rotary cutting tool (20), according to claim 7, wherein the fluid channel (46) passes past the holder forward surface (30).

9. The rotary cutting tool (20), according to claim 1, further comprising a fastening arrangement (40) comprising a chucking nut (42) and a collet (44); wherein:
the cutting portion (36) is releasably attached to the tool holder (22) by the chucking nut (42) and the collet (44).

10. The rotary cutting tool (20), according to claim 1, wherein:
in a radial cross-section taken in a plane perpendicular to the tool central axis (A) through the fluid channel (46), a cross-sectional area of the fluid channel (46) is greater at the channel turbine chamber (52) than at the channel turbine antechamber (54).

11. The rotary cutting tool (20), according to claim 1, wherein:
the fluid channel (46) includes a channel turbine post-chamber (56) adjoining the channel turbine chamber (52) and located forward thereof with respect to the forward flow direction ($F_F$); and
the cutting portion (36) extends into the channel turbine post-chamber (56) and is spaced apart from the turbine (60).

12. The rotary cutting tool (20), according to claim 1, wherein the channel turbine chamber (52) is aligned with the tool central axis (A).

13. The rotary cutting tool (20), according to claim 1, wherein:
the turbine (60) comprises a plurality of radially extending turbine blades (62); and
the plurality of radially extending turbine blades (62) are made of aluminum.

14. The rotary cutting tool (20), according to claim 1, wherein the energy harvesting arrangement (58) further comprises an electric generator (64) which is located in the channel turbine chamber (52) and is drivingly connected to the turbine (60).

15. The rotary cutting tool (20), according to claim 14, wherein the energy harvesting arrangement (58) further comprises two cables (66) extending from the electric generator (64) and terminating at two electrical connectors (70) mounted on the tool holder (22).

16. The rotary cutting tool (20), according to claim 15, wherein a portion of each of the two cables (66) is located in the fluid channel (46).

17. The rotary cutting tool (20), according to claim 15, wherein:
the tool holder (22) comprises holder rear and forward surfaces (28, 30) and a holder peripheral surface (32) extending therebetween about the tool central axis (A), the holder rear surface (28) being located at the rearward end (24) of the rotary cutting tool (20);
the holder peripheral surface (32) comprises a holder lateral recess (68) recessed therein;
the rotary cutting tool (20) comprises an electrical arrangement (72), the two electrical connectors (70) being located thereat; and
the electrical arrangement (72) is located in the holder lateral recess (68).

18. The rotary cutting tool (20), according to claim 17, wherein the electrical arrangement (72) includes a sensor configured to monitor the cutting tool and/or a cutting operation.

19. The rotary cutting tool (20), according to claim 18, wherein the electrical arrangement (72) further comprises a rechargeable battery configured to power the sensor, the rechargeable battery receiving power from the electric generator (64).

20. The rotary cutting tool (20), according to claim 17, wherein the holder lateral recess (68) and/or the electrical arrangement (72) overlap the channel turbine antechamber (54) in an axial direction along the tool central axis (A).

21. The rotary cutting tool (20), according to claim 1, wherein the fluid channel (46) contains the tool central axis (A) for the entire length of the fluid channel (46), through the tool holder (22).

22. The rotary cutting tool (20), according to claim 21, wherein the fluid channel (46) contains the tool central axis (A) for the entire length of the fluid channel (46), through both the tool holder (22) and the cutting portion (36).

23. The rotary cutting tool (20), according to claim 1, wherein the turbine receptacle (53) is received into the tool holder (22) at the forward end (26) of the tool holder (22).

24. A rotary cutting tool (20) having a tool central axis (A) which defines opposite forward and rearward directions ($D_F$, $D_R$) and about which the rotary cutting tool (20) is rotatable, the rotary cutting tool (20) comprising:
a tool holder (22) comprising opposite rearward and forward ends (24, 26);
a cutting portion (36) releasably attached to the forward end of the tool holder (22), the cutting portion (36) comprising a cutting edge (38);
a fluid channel (46) comprising:
a) a channel inlet opening (48) located at the rearward end (24) of the tool holder (22) and configured to receive a supply of fluid;
b) a channel outlet opening (50) in fluid communication with the channel inlet opening (48) and configured to discharge fluid that entered at the channel inlet opening (48); and c) a channel turbine chamber (52) located between the channel inlet and outlet openings (48, 50);

a turbine receptacle (53) formed as a separate element from the tool holder (22), the turbine receptacle (53) being received into the tool holder (22) and occupying the channel turbine chamber (52); and an energy harvesting arrangement (58) comprising:

a turbine (60) located in the turbine receptacle (53) occupying the channel turbine chamber (52), the turbine (60) configured to be rotated by fluid flowing from the channel inlet opening (48) to the channel outlet opening (50), in a forward flow direction ($F_F$);

wherein:

the channel outlet opening is located at the cutting portion (36); and the channel outlet opening is oriented to discharge said fluid that entered at the channel inlet opening (48) as a coolant, after said fluid has rotated the turbine (60).

25. The rotary cutting tool (20), according to claim 24, wherein the turbine receptacle (53) is received into the tool holder (22) at the forward end (26) of the tool holder (22).

\* \* \* \* \*